US006900921B2

(12) United States Patent
Valette (10) Patent No.: US 6,900,921 B2
(45) Date of Patent: May 31, 2005

(54) OPTICAL DEFLECTION MODULE

(75) Inventor: Serge Valette, Grenoble (FR)

(73) Assignee: Teem Photonics, Meylan (FR)

( * ) Notice: Subject to any disclaimer, the term of this patent is extended or adjusted under 35 U.S.C. 154(b) by 0 days.

(21) Appl. No.: 10/469,596

(22) PCT Filed: Mar. 1, 2002

(86) PCT No.: PCT/FR02/00755

§ 371 (c)(1),
(2), (4) Date: Mar. 5, 2004

(87) PCT Pub. No.: WO02/071126

PCT Pub. Date: Sep. 12, 2002

(65) Prior Publication Data

US 2004/0130810 A1 Jul. 8, 2004

(30) Foreign Application Priority Data

Mar. 2, 2001 (FR) .............................. 01 2923

(51) Int. Cl.[7] ....................... G02B 26/00; G02B 26/08; G02B 6/26
(52) U.S. Cl. ..................... 359/291; 359/290; 359/298; 359/201; 385/18
(58) Field of Search .................... 359/290, 291, 359/298, 201; 385/15–18, 115, 116

(56) References Cited

U.S. PATENT DOCUMENTS 5,553,175 A   9/1996 Laughlin .................... 385/16

FOREIGN PATENT DOCUMENTS

EP   0 873 811   10/1998
GB   2 346 453   8/2000

OTHER PUBLICATIONS

Patent Abstracts of Japan, vol. 2000, No. 4, Aug. 31, 2000–& JP 2000 019434 A (Nippon Signal Co Ltd:The), Jan. 21, 2000 abstract; figure 5.

Patent Abstracts of Japan, vol. 013, No. 342 (P–908), Aug. 2, 1989 –&JP 01 102515 A (Nippon Telegr & Telelph Corp), Apr. 20, 1989 abstracct ; figure 3.

Patent Abstracts of Japan, vil. 2000, No. 01, Jan. 31, 2000–& JP 11 287961 A (Nippon Signal Co Ltd:The), Oct. 19, 1999 abstract; figures.

*Primary Examiner*—Georgia Epps
*Assistant Examiner*—Jack Dinh
(74) *Attorney, Agent, or Firm*—Young & Thompson (57) ABSTRACT

An optical deflection module adapted to generate a plurality of angular positions for at least one incident optical beam. For each optical beam, the module comprises a line containing:—a plurality of N cascading deflection elements ($MD_1$, $MD_2$, ... $MD_I$, ... $MD_N$) which can each take respectively $P_1$, $P_2$, ... $P_I$, ... or $P_N$ different angular deflection configurations around at least one given axis; and—a plurality of N–1 optical conjugate elements ($MCO_1$, $MCO_2$, ... $MCO_I$, ..., $MCO_{N-1}$) which are each disposed between two successive deflection elements in order to produce an object/image conjugate between the successive deflection elements.

29 Claims, 6 Drawing Sheets

OPTICAL DEFLECTION MODULE

1. TECHNICAL FIELD

The subject of the invention is the production of an optical deflection module for obtaining, from an initial optical beam, a large number of different potential angular deflection positions, that are favorably equidistant, while using deflection means that individually have only a limited number (for example, 2, 3 or 4) deflection positions. Thus, the invention relates to a set of elementary deflector means, the combination of which makes it possible to amplify the number of optical deflection positions relative to the number of deflection positions that each of these deflector means permits.

The invention is readily generalized to a set of incident optical beams arranged in any spatial configuration (linear arrays, matrices, etc).

There are numerous fields of application, especially:

routing of information transmitted by optical fibers;

information storage;

surface inspection by optical means;

rangefinding;

more generally, all sectors requiring spatial, in particular incremental, scanning of optical beams.

2. PRIOR ART

It is known in optics to deflect a light beam in various ways: electrically addressable rotating mirrors, acoustooptic cells, diffraction gratings, etc.

All these methods allow deflection in a large number of possible angular positions.

The use of rotating mirrors is one of the most common; it generally involves a single mirror that can adopt a large number of angular positions, these either being incremental (use of stepper motors) or analog (use of rotating motors).

All these methods are satisfactory in conventional setups in which the overall size of the deflection system is not a critical parameter.

However, they are very ill suited in complex architectures in which several light beams have to be taken into account and which require the use of micromirrors usually produced by the fabrication processes involved in microtechnologies.

This is because such micromirrors having a large number of stable angular positions are very difficult to fabricate and must be combined with very complex electronic servocontrol systems, prejudicial both as regards reliability and as regards economics.

In contrast, it is much simpler, from the technological standpoint, to produce micromirrors that can adopt a small number of angular positions (2 or 3 about a given axis) that then correspond to stable and predetermined mechanical positions requiring no servocontrol.

However, in many applications the limited number of accessible angular positions obtained with these micromirrors constitutes an unacceptable drawback.

3. PRINCIPLE OF THE INVENTION

The object of the invention is to overcome this difficulty, while allowing the number of accessible angular positions to be increased by using a particular architecture involving a cascade of such micromirrors and more generally of the angular deflection elements in question. The invention will be very beneficial in the field of optical routing.

The aim of the invention is thus to provide a module for obtaining a large number of different, advantageously equidistant, angular deflection positions, with respect to a light beam, using deflection means that, individually, allow only a small number of such deflection positions to be obtained.

For this purpose, the invention involves the placement of deflection elements in cascade, combined with suitable optical conjugation elements between the consecutive deflection elements of the cascade. This general principle of the invention may be implemented in various architectures according to the methods of operation of the deflection elements involved and in particular in the case of micromirror-type deflection elements.

More particularly, the invention proposes an optical deflection module designed to generate a plurality of angular positions for at least one incident optical beam, this module comprising, for each optical beam, a line comprising:

a plurality of N deflection elements $DM_1$, $DM_2$, ... $DM_i$, ... $DM_N$) placed in cascade and each able to adopt, respectively, $P_1$, $P_2$, ... $P_i$, ... or $P_N$ different angular deflection configurations about at least one given axis; and a plurality of N−1 optical conjugation elements ($OCM_1$, $OCM_2$, ... $OCM_i$, ... $OCM_{N-1}$) each placed between two successive deflection elements so as to produce an object/image conjugate between these successive deflection elements.

It will be appreciated that the invention thus proposes to use only simple deflection elements in relatively small number, insofar as each deflection element is involved in the treatment of each beam deflected by the previous deflection element. Despite the increase, compared with the known solutions, in the number of deflection elements, it should be clearly understood that not only is their construction simplified but also their control. In the particular case in which these elements have only two positions, the positional control may thus be effected by the single datum of the value of a bit (0 for one of the positions and 1 for the other). Furthermore, this makes it possible to choose end-stop positions, where predetermined positions set by end stops make the need for complex electronic servocontrol unnecessary.

According to preferred, optionally combined, arrangements of the invention:

the module, designed to generate a plurality of angular positions for a plurality of incident optical beams, comprises one row for each beam, and the deflection elements and the optical conjugation elements of each row are grouped together, with the homologous elements of the other rows, within entities consisting of linear arrays or of matrices. These are conventional configurations, easy to fabricate and to handle. These entities therefore group together the elements of the same type and of the same suffix;

the deflection elements grouped together within each entity have numbers $P_1$, $P_2$, ..., $P_i$, ... or $P_N$ of different angular deflection configurations are identical. The entity thus has a modular structure, with elements that are easy to replace;

the deflection elements ($DM_1$, $DM_2$, ... $DM_i$, ... $DM_N$), placed in cascade and each able to adopt, respectively, $P_1$, $P_2$, ... $P_i$, ... or $P_N$ different angular deflection configurations, have single parallel given axes. The arrangement of these elements is facilitated thereby and the combination of deflections thus possible corresponds to a geometrical figure easy to manage;

the deflection elements ($DM_1$, $DM_2$, ... $DM_i$, ... $DM_N$), placed in cascade and each able to adopt, respectively, $P_1$, $P_2$, ... $P_i$, ... or $P_N$ different angular deflection configurations, have single given axes parallel to one or other of the two reference axes (OX, OY). The same comment as in the previous paragraph applies here, despite a slightly greater complexity in the management of the deflections produced by the successive elements;

the deflection elements ($DM_1$, $DM_2$, ... $DM_i$, ... $DM_N$), placed in cascade and each able to adopt, respectively, $P_1$, $P_2$, ... $P_i$, ... or $P_N$ different angular deflection configurations, each have two given axes parallel to two reference axes (OX, OY). The elements remain of simple design, but do allow the comments of the previous two paragraphs to be satisfied;

the different angular deflection configurations are equidistant about the given axes. This corresponds, of course, to a geometrical configuration particularly easy to control.

One particularly useful case is that in which the deflection elements $DM_1$, $DM_2$, ... $DM_i$, ... $DM_N$ in cascade are elements (10, 11, 12, 13, etc) each able to adopt, by tilting about at least one given axis, respectively, $P_1$, $P_2$, ... $P_i$, ... $P_N$ different angular position configurations making it possible to generate an equivalent number of different angular deflection positions $ADP_1$, $ADP_2$, ... $ADP_i$, ... $ADP_N$, each separated angularly by respective values $\delta\theta_1$, $\delta\theta_2$, ... $\delta\theta_i$, ... $\delta\theta_N$ about at least one family of rotation axes $OX_1$, $OX_2$, ... $OX_i$, ..., $OX_N$. The mirror-type deflection elements having a small number of positions are particularly simple to produce, even in small sizes, especially when only two positions (which therefore can be end-stop positions) or three positions (two extreme positions on either side of a reference position) are provided. It should be noted that these two or three positions are defined along a single tilt axis and that, by providing several tilt axes, the total number of possible positions is thus increased.

According to preferred, advantageously combined arrangements:

the families of rotation axes have a common direction. This corresponds to one particularly simple case;

the total angular excursions of each of the deflection elements are the same. The elements may therefore be identical;

the magnifications $G_{i,i+1}$ allowing pairwise conjugation of the various consecutive deflection elements $DM_i$ and $DM_{i+1}$ are equal to:

$G_{i,i+1}=P_i\times(P_{i+1}-1)/(P_i-1)$, which results in equidistant angular positions (the symbol × denotes a multiplication);

the deflection elements (10, 11, 12, 13, etc) each have two different angular positions separated by an angle $\delta\theta_X$ about axes parallel to a common direction OX and two different angular positions separated by an angle $\delta\theta_Y$ about axes parallel to a common direction OY and such that the magnifications $G_{i,i+1}$ of the various optical conjugation elements are all equal to 2, the angle $\delta\theta_Y$ being advantageously equal to $\delta\theta_X$ and the axis OY preferably being perpendicular to OX. This is a very simple configuration;

the deflection elements are swivel mirrors; according to one advantageous embodiment, they can swivel in two angular positions about each tilt axis, and the magnification $G_{i,i+1}$ is equal to 2;

the module is characterized by a series placement of two successive cascades, the various deflection elements (10, 11, 12, 13, ... ) of which can adopt angular positions $P_1$, $P_2$, ... $P_i$, ... $P_N$ only along a single common direction and in which the single common direction of the rotation axes of each of the deflection elements of the first cascade is chosen to be orthogonal to the common direction of the rotation axes of each of the deflection elements of the second cascade. This makes it possible to obtain a matrix of angular deflection positions;

the number of different angular positions $P_1$, $P_2$, ... $P_i$, ... $P_N$ that can be adopted by the various deflection elements $DM_1$, $DM_2$, ... $DM_i$, ... $DM_N$ about the various rotation axes of common direction $OX_1$, $OX_2$, ... $OX_i$, ..., $OX_N$ is equal to 2 or 3, it being possible for the magnifications $G_{i,i+1}$ then to adopt the following various values:

$G_{i,i+1}=P_i\times(P_{i+1}-1)/(P_i-1)=2$ for $P_i=2$ and $P_{i+1}=2$ $G_{i,i+1}=P_i\times(P_{i+1}-1)/(P_i-1)=3$ for $P_i=3$ and $P_{i+1}=3$ $G_{i,i+1}=P_i\times(P_{i+1}-1)/(P_i-1)=4$ for $P_i=2$ and $P_{i+1}=3$ $G_{i,i+1}=P_i\times(P_{i+1}-1)/(P_i-1)=3/2$ for $P_i=3$ and $P_{i+1}=2$ Thus, as already indicated, the case in which this number is equal to 2 is particularly easy to manage, each time by a single bit;

the deflection elements consist of swivel micromirrors produced using the collective fabrication processes involved in microtechnologies and/or the optical conjugation elements associated with two consecutive deflection means comprise respectively at least one lens; preferably each optical conjugation element associated with two consecutive deflection elements comprises at least two lenses in confocal configuration, the ratio of the focal lengths of which is equal to the desired magnification between the two deflection elements.

Whatever the details of the elements, preferably:

the deflection elements involved are all inclined to the optical axes of the device at an angle $\phi$ chosen to be 45°;

the deflection and optical conjugation elements are grouped in linear arrays or in matrices and are all inclined at the same angle $\phi$ to the general optical axis of the device, but for which each of the optical axes of the various conjugation elements (20, 21, 22, 23, etc) remains parallel to this general optical axis, thus minimizing the aberrations introduced by these various elements into the various deflected beams involved;

the deflection positions of each of the deflection elements are monitored by monitoring means using:

spatial splitter elements for taking off a fraction of the light power of the optical signal beams deflected by the various deflection means;

optical projection elements for converting, in a one-to-one manner, the various angular deflection positions into as many spatial positions, these optical imaging means being grouped in configurations identical to those of the deflection means; and detection elements for detecting the spatial positions thus formed, having a number of pixels at least equal to the total number of angular positions generated within the control stage in question, the configuration of the pixels of the photodetector being homothetic with that of the set of angular deflection positions to be monitored;

the optical projection means are associated with image magnification means;

the detection means are linear arrays or matrices of CMOS photodetectors; and the means for monitoring the angular deflection positions uses ancillary optical beams that have a wavelength favorably different from that of the principal beams and are superposed on the latter using dichroic plates.

Also preferably, the optical module furthermore includes an additional conjugation element placed after the final deflection element.

The additional conjugation element allows the value of the angular separations between the deflected beams to be adjusted. Advantageously, this element comprises two lenses placed in a confocal configuration.

4. LIST OF FIGURES

The objects, features and advantages of the invention will become apparent from the following description, given by way of illustration by implying no limitation, together with the appended drawings in which.

5. DETAILED DESCRIPTION OF THE INVENTION

Figure 1A:
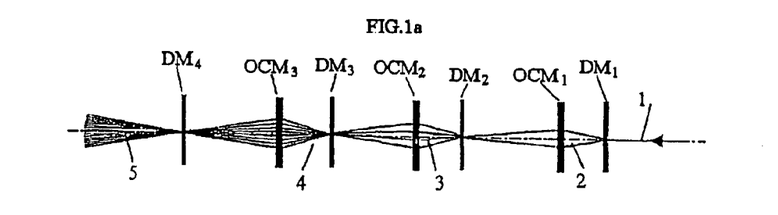
FIG. 1a shows the principle of an optical deflection module according to the invention with a single row, employing a cascade of elementary optical deflectors.
Figures 2, 11:
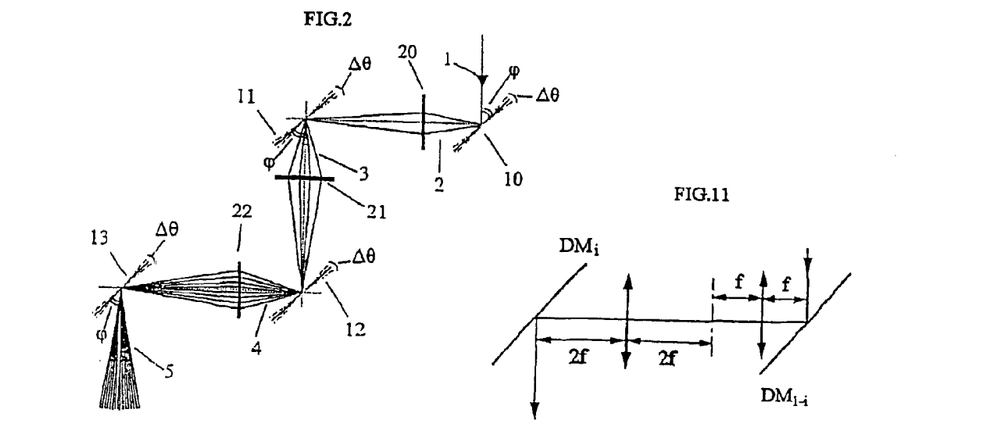
FIG. 2 is a diagram of an optical deflection module according to FIG. 1a, in which the individual optical deflectors are of the mirror type.
FIG. 11 is a simplified diagram of two deflection elements conjugate with respect to two confocal lenses.

FIG. 1a illustrates the general principle of the invention, involving the deflection of a single incident light beam 1 by a cascade of N (in this case equal to 4) elementary deflection means called $DM_i$ (the suffix i denotes the number of the element in the cascade) and denoted in FIG. 2 by the numerical references 10, 11, 12 and 13. To simplify matters and without the generality of the proposed architecture being affected, the deflection means drawn in FIG. 1a each provide two angular deflection positions lying in a single deflection plane (deflection upward or downward in the plane of the figure). In general, the deflector means of a module according to the invention have, individually, a small number of possible positions—a minimum of two positions, or three or even four; in practice, this "small number" of positions depends on the technology employed.

Optical conjugation means denoted $OCM_i$ (three in number in FIG. 1a, i.e. the number of optical conjugation means is one less than the number of deflection means), denoted by the numerical references 20, 21 and 22 in FIG. 2, ensure appropriate object/image conjugation between two consecutive deflection means with appropriate magnifications $G_{12}$, $G_{23}$ and $G_{34}$ (the magnifications $G_{i,i+1}$ between the deflection means i and i+1 here being equal to 2, as will be recommended in the rest of the description). FIG. 1a clearly illustrates the increase, at the exit of each of the deflection means, in the number of potentially deflected beams 2, 3, 4 and 5.

Figure 1B:
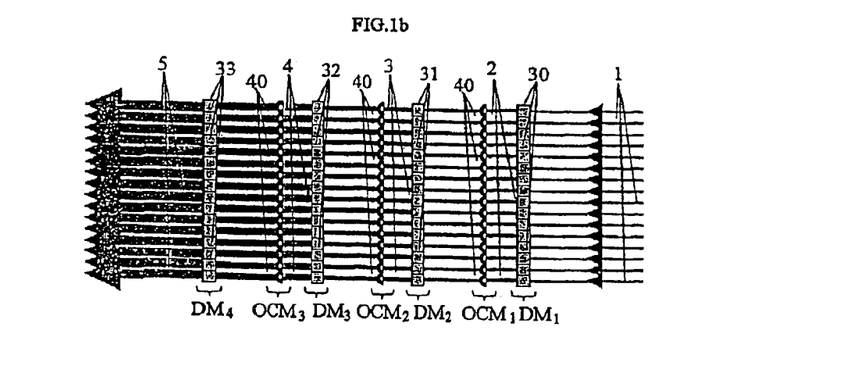
FIG. 1b shows the principle of an optical deflection module according to the invention with several rows, employing a cascade of groups of optical deflectors.

FIG. 1b shows the general principle of the invention in the case of any number K of incident beams 1 (here, K is equal to 16) with the use of cascaded deflection means (four in number in the figure) arranged in four linear arrays 30, 31, 32, 33 of K deflection elements and optical conjugation means arranged in three linear arrays 40, 41, 42 of K conjugation elements. This arrangement according to the invention makes it possible to generate, from each of the K incident beams 1, K families of deflected beams 2, 3, 4, 5, the increasing number of possible angular deflection positions of which at the exit of each stage of the cascade is indicated in FIG. 1b by the increasing line widths for each of the K families of deflected optical beams. If we call "row" the set of elements acting in succession on a beam (which is not necessarily straight), these linear arrays form a group of homologous elements, that is to say the elements of the same type and of the same suffix in these rows. Hereafter, the aforementioned numerical references denote the elements if there is only a single row, or all the elements of the same type and of the same suffix if there are several rows.

For the sake of simplifying the illustration, FIGS. 1a and 1b show configurations of incident and deflected light beams lying in the plane of the figure. In a variant (not shown), the linear arrays in FIG. 1b may be oriented so as to cause deflections in a plane perpendicular to the plane of the figure. The invention may be further generalized, under certain conditions, to deflection means for generating beams deflected in various deflection planes of any orientation. It may also, as we have already pointed out, be generalized to configurations of incident beams 1 arranged in matrices, the deflection and optical conjugation means then also being composed of elements arranged in matrices with the same geometrical configuration.

The principle of the invention may be exploited with various deflection means, even if, hereafter, these deflection means will be described as being of the mirror type, these mirrors being single mirrors or composed of mirror elements arranged in linear arrays or in matrices.

Thus, FIG. 2 shows one embodiment of the diagram in FIG. 1a involving a single incident light beam with a cascade of deflection means 10, 11, 12 and 13 of the micromirror type (called $M_1$, $M_2$, $M_3$, $M_4$) having two possible angular positions with an angular excursion 80 (these positions are indicated by broken lines on either side of the mean position of each micromirror, this mean position therefore not being here one of the possible positions) and with optical conjugation means 20, 21, 22 of the microlens type, that provide the desired object/image conjugates between the consecutive mirrors with the suitable magnifications (in this particular case, equal to 2). The inclination $\phi$ of the micromirrors relative to the local direction of the optical path of the beam (and therefore relative to planes perpendicular to the mean incident optical beams of the system) is chosen here, to simplify the drawing, to be equal to 45°. The mean optical beams are defined by the various directions taken by the incident optical beam during the successive reflections when the various mirrors are oriented along the mean positions indicated by solid lines in this FIG. 2 (the one-row optical system of FIG. 1a therefore has $\phi$=0).

Of course, it is possible for this angle $\phi$ to have any value between 0 and 90° chosen on the basis of size and simplicity criteria, set by the manufacturer, for constructing the optical deflection module.

Moreover, the present description is given basically in the case, simple to put into practice, in which the deflector means have the same limited number of angular positions $P_1, P_2, P_3, \ldots P_i, \ldots P_N$ about a given rotation axis (therefore each generating, from one incident optical beam, an identical number of angular deflection positions) and in which the angular excursions $\Delta\theta_1, \Delta\theta_2, \ldots \Delta\theta_i, \Delta\theta_N$ are identical (equal to $\Delta\theta$). In this case, the magnification of the microlenses between two successive deflector means is equal to the number of positions $P_i$; this magnification is thus 2 if all the individual deflectors have two positions, is 3 if all the individual deflectors have three positions, and so on.

However, it is possible for the number of positions of the individual detectors not to be all identical. In this case (assuming that it is nevertheless desirable to maintain equidistance between the various possible angular positions), it may be demonstrated that the value of the magnifications $G_{i,i+1}$ involved by each of the elements of the optical conjugation means $OCM_i$ and needed to obtain, at the exit of each of these mirror elements, nonredundant and equidistant angular deflection positions, is equal to:

$$G_{i,i+1} = P_i \times (P_{i+1}-1)/(P_i-1).$$

In FIG. 2, the number of angular positions $P_1$, $P_2$, P3, . . . $P_i$, etc. adopted by each mirror is equal to 2; the optical conjugation means $OCM_i$, denoted by 20, 21, 22, therefore also have magnifications equal to 2. A variant will be explained with regard to FIG. 11.

Figures 3A, 3B, 3C:
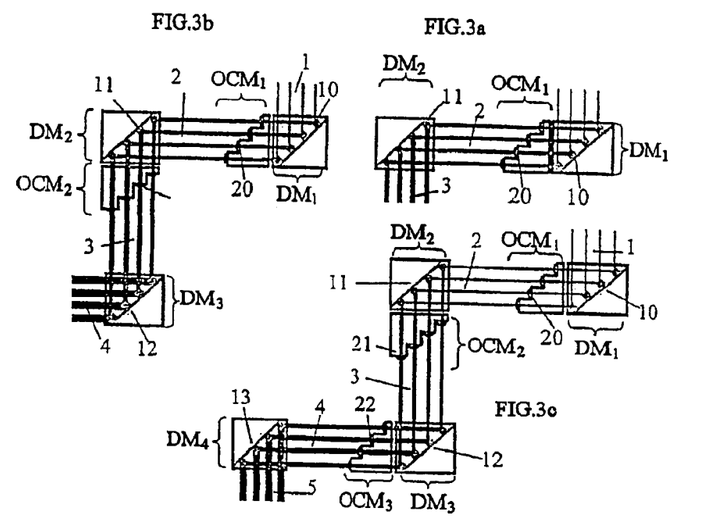
FIG. 3a is a diagram of an optical deflection module involving a cascade of two deflection means having four mirror-type elements (angle of inclination φ=45°) for four incident beams.
FIG. 3b is a diagram of a similar module, with a cascade of three deflection means having four mirror-type elements (angle of inclination φ=45°)
FIG. 3c is a diagram of yet another similar module, but with a cascade of four deflection means having four mirror-type elements (angle of inclination φ=45°)

FIGS. 3a, 3b and 3c show various possible embodiments of the invention in the case of four incident beams 1 and with an increasing number of deflection means $DM_1$, $DM_2$, $DM_3$, $DM_4$ denoted by the numerical reference 10, 11, 12, 13. This number is equal to 2 (FIG. 3a), 3 (FIG. 3b) and 4 (FIG. 3c), respectively. The optical conjugation means $OCM_1$, $OCM_2$, $OCM_3$, numbering one, two and three in the figures and being denoted by the numerical references 20, 21 and 22, respectively, are, of course, also each composed of four elements; here they are of the microlens type.

The FIGS. 3a, 3b and 3c show possible embodiments of the invention in configurations of folded structures for which the angle $\phi$ is taken as 45°; the deflection means are composed of linear arrays of four micromirrors and the optical conjugation elements are linear arrays of microlenses.

In these FIGS. 3a, 3b and 3c, the increasing number of angular deflection positions of the various deflected beams 2, 3, 4, 5, etc. adopted at the exit of the various deflection means $DM_1$, $DM_2$, $DM_3$, $DM_4$, etc. is shown symbolically by an increasing width of the thickness of the lines representing these various deflected beams obtained from the initial beams 1.

These conjugation means 20, 21, 22 are shown in positions corresponding to magnifications $G_{i,i+1}$ equal to 2 as in the case of FIGS. 1 and 2 (this $G_{i,i+1}$ value is that corresponding to the case of mirrors oscillating about two angular positions (see the general formula given above)).

The geometrical position of the various elements forming the conjugation means takes account of the mean inclination $\phi$ so as to preserve identical object/image conjugate conditions for each of the various families of deflected rays involved; to do this, the centers of the elements making up the conjugation means (numbering four in FIGS. 3a, 3b and 3c) have to be aligned along straight lines inclined at an angle $\phi$ (45° in the figures) relative to the optical axis of the system, the optical axes of each of these elements favorably remaining parallel to this optical axis (as shown in the figures), in order to minimize the aberrations introduced by these elements.

The following figures allow more detailed examination of the various particular beneficial cases of the invention involving micromirrors of various types and show a few examples of angular deflection position configurations that can be obtained.

Figure 4A:
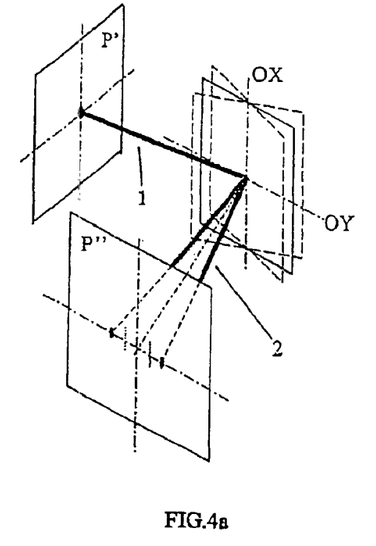
FIG. 4a is a simplified diagram showing the angular deflection positions for a mirror having two positions of rotation about a single axis OX.
Figure 4B:
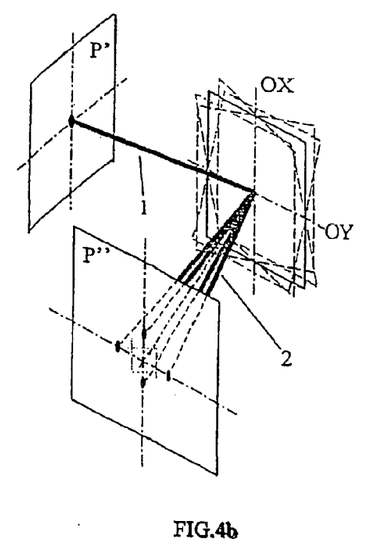
FIG. 4b is a simplified diagram showing the angular deflection positions for a mirror having two positions of rotation about an axis OX and two positions of rotation about an axis OY.

Thus, FIGS. 4a and 4b show a simple geometrical construction explaining how an incident beam 1 is reflected by a rotating mirror that can adopt two positions of rotation about a single rotation axis OX (FIG. 4a) and by a rotating mirror that can adopt two positions of rotation about two orthogonal rotation axes OX and OY (FIG. 4b). These FIGS. 4a and 4b may, of course, be generalized to configurations of mirrors that can adopt any number of angular positions about any rotation axes, whether orthogonal or not.

Figure 5:
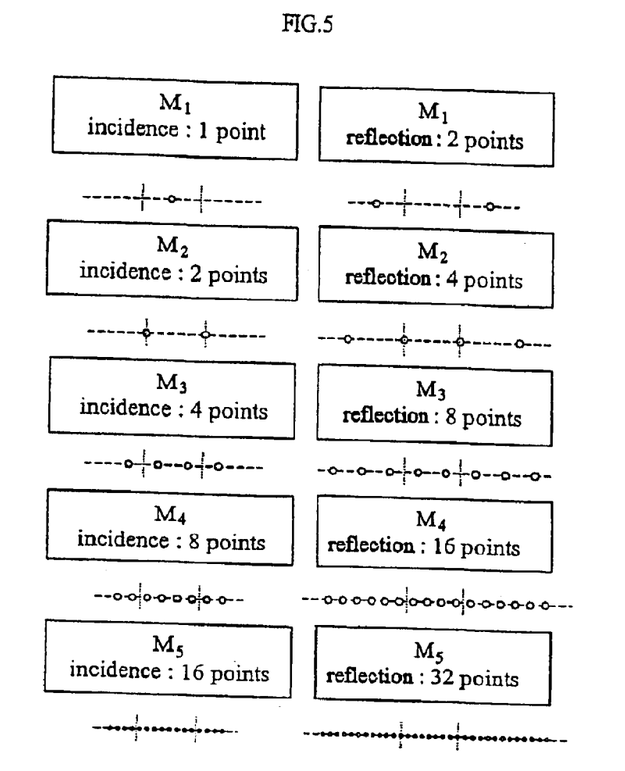
FIG. 5 is a diagram showing the change in the number of angular positions before (on the left) and after (on the right) passage through each deflection means of a cascade of five deflection means having a single mirror with an axis that can adopt two angular positions about this single axis OX.

FIG. 5 uses the construction of FIG. 4 to show the change in the angular deflection positions of an incident light beam over the course of the various reflections off cascaded mirror-type deflection means (numbering five in this example, $M_1$ to $M_5$), each able to adopt two positions of rotation about an axis OX. Each level shows the deflection positions immediately before and after the deflector means in question. In this particular case, and by choosing optical conjugation means working with magnifications $G_{i,i+1}$ of 2 (see above), 2, 4, 8, 16 and 32 angular deflection positions lying along a row are obtained at the exit of the various mirrors, respectively.

Figure 6:
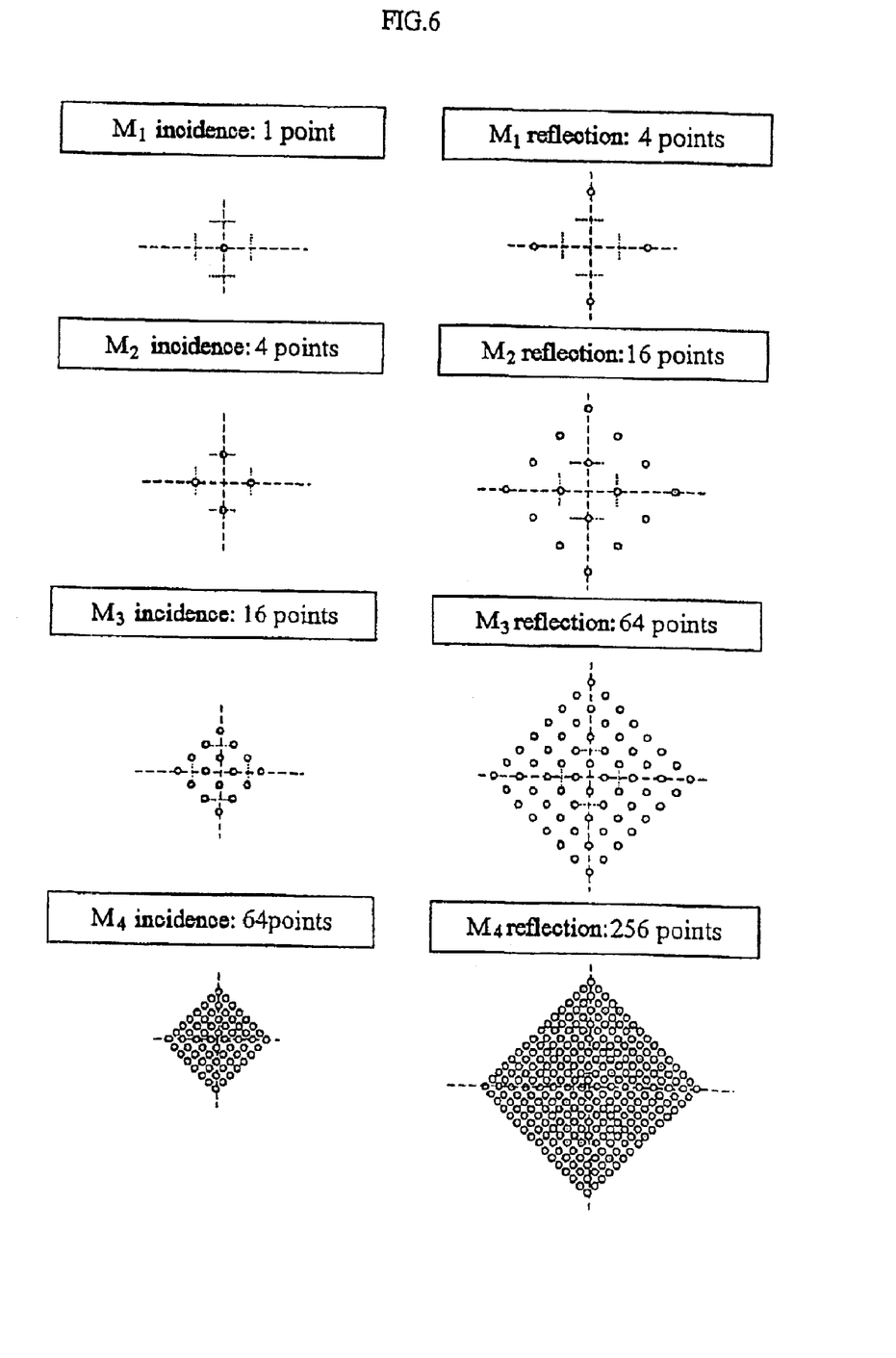
FIG. 6 is a similar diagram showing the change in the number of angular positions before (on the left) and after (on the right) passage through each deflection means of a cascade of four deflection means having single mirrors with two orthogonal axes OX and OY and able to adopt two angular positions about each of these axes.

FIG. 6 uses the same formalism and shows the change in the angular deflection positions of an incident light beam over the course of the various reflections off cascaded mirror-type deflection means (a cascade of four mirrors in this example, $M_1$ to $M_4$), each able to adopt two positions of rotation about two orthogonal rotation axes OX and OY. In this particular case, and again by choosing optical conjugation means working with magnifications $G_{i,i+1}$ of 2, 4, 16, 64 and 256 deflection positions arranged in a square matrix (owing to the orthogonality of the axes and to the identical angular excursion values along each of the axes) are obtained at the exit of the various mirrors, respectively.

A few further comments may be made in regard to these FIGS.

5.1 Cascade of Mirrors Oscillating About a Common Axis OX

This is the case shown in FIG. 2, with a cascade of micromirror-type deflection means composed of mirror elements 10, 11, 12, 13, etc. oscillating about axes $OX_1$, $OX_2$, $OX_3$, ... $OX_i$, ... $OX_L$ parallel to a common direction OX perpendicular to the plane of the figure.

The incident beam 1 is deflected by the mirror elements 10 into $P_1$ equidistant angular deflection positions ($P_1=2$ in FIG. 2) separated angularly by the value $\delta\alpha_1$ ($\delta\alpha_1=2\Delta\theta_1/(P_1-1)=2\Delta\theta/(P_1-1)=2\Delta\theta$ in the particular case of FIG. 2) that lie in a plane perpendicular to OX. These $P_1$ beams 2 optically deflected by the mirror elements 10 are conjugate with respect to the elements 20 of the conjugation means $OCM_1$ and imaged with the magnification $G_{1,2}$ on the mirror elements 11 of the second deflection means $DM_2$, which can adopt $P_2$ angular positions in such a way that:

$$G_{1,2}=P_1(P_2-1)/(P_1-1).$$

Each beam potentially deflected by the mirror elements 10 ("potentially" as the mirrors adopt only a single position at a time) can then be deflected into $P_2$ positions by the mirror elements 11.

The mirror elements 11 therefore potentially provide $P_1 \times P_2$ deflected optical beams that are angularly equidistant, because of the value of the magnification $G_{1,2}$ chosen, and lie in the same plane perpendicular to OX.

These deflection positions are all different and the diagram in FIG. 2 clearly shows that the optical conjugation means between the pairs of consecutive mirrors of the cascade have indeed two essential functions:

to fulfil the imaging function needed for the cascadability of the system (this function is fulfilled whatever the magnifications $G_{i,i+1}$ chosen);

to fulfil the unicity and equidistance of the various angular deflection positions thanks to the particular choice of the magnifications $G_{i,i+1}$.

Likewise, the mirror elements 12 of the third deflection means $M_3$ will give $P_1 \times P_2 \times P_3$ potential deflected optical beams that are angularly equidistant, and so on, the mirror elements of the i-th deflection means $M_i$ giving $P_1 \times P_2 \times P_3 \times \ldots P_i = P_{Ti}$ angularly equidistant potential deflected beams and the elements of the last deflection means MN of the cascade giving $P_1 \times P_2 \times P_3 \times \ldots P_i \times \ldots P_N = P_{TN}$ potential deflected beams lying in the same plane perpendicular to OX and angularly equidistant insofar as the various magnifications $G_{i,i+1}$ involved in the object/image relationship between the mirror elements of the consecutive deflection means $M_i$ and $M_{i+1}$ are equal to the value given above:

$$G_{i,i+1}=P_i(P_{i+1}-1)/(P_i-1).$$

The angular separation $\delta\alpha_N$ between the various angular positions at the exit of the mirror elements of the deflection means $M_N$ is given below (the symbol $\Pi$ denoting the product of the values of the term in question for the various values of the suffix of this term):

$$\delta\alpha_N=\delta\alpha_1/\Pi_{1\to N-1}(G_{i,i+1})=\delta\alpha_1\Pi_{1\to N-1}((P_i-1)/P_i)(P_{i+1}-1))$$

whereas the total angular excursion $\Delta\alpha_N$ is equal to:

$$\Delta\alpha_N=((\Pi_{1\to N}P_i)-1)\delta\alpha_N.$$

One beneficial particular case is that in which the number of angular positions $P_1, P_2, P_3, \ldots P_i, \ldots P_N$ is the same for each of the micromirrors involved is equal to P. In this case:

$$G_{i,i+1}=P=\text{constant}.$$

The number of angular positions at the exit of the elements of the N-th deflection means is $P^N$, the angular separation $\delta\alpha_N$ between the various angular positions is:

$$\delta\alpha_N=\delta\alpha_1/P^{N-1}=2\Delta\theta/(P^{N-1}(P-1))$$

and the total angular excursion $\Delta\alpha_N$ is:

$$\Delta\alpha_N=(P^N-1)\delta\alpha_N=2\Delta\theta(P^N-1)/(P^{N-1}(P-1))$$

i.e.:

$$\Delta\alpha_N=2\Delta\theta P/(P-1)-2\Delta\theta/(P^{N-1}(P-1))$$

which value tends toward $2\Delta\theta P/(P-1)$ when N becomes large.

To fully understand the change of an incident ray through the cascade of mirrors, it is beneficial to use the geometrical construction given in FIG. 4a which shows how an incident optical beam 1 is converted into two deflected beams 2 by reflection off a mirror that can adopt two positions (shown by dashes) about a rotation axis OX (the case of a mirror having two times two positions about two orthogonal rotation axes OX and OY (FIG. 4b) will be commented upon later).

By considering the intersections of the incident and reflected beams by planes P' and P" perpendicular to the axis of the optical system lying respectively on either side of and at an equal distance from the mirror, it is easily possible to visualize the change in the light rays over the course of the various reflections off the mirrors of the cascade. In this representation, the figure of the deflected positions (trace of the deflected beams in the plane P") is derived from the figure of the incident positions (trace of the incident beams in the plane P') by symmetry about the various rotation axes. In the simple example of FIG. 4a, the incident beam 1 gives two beams 2 deflected by the mirror $M_1$, the traces of which in the plane P" are aligned parallel to OY (in the case of FIG. 4b, the incident beam 1 gives four (two times two) beams 2 deflected by the mirror $M'_1$, the traces of which in the plane P" are aligned parallel to OX and to OY, respectively).

In this representation, the optical magnification conjugate $G_{i,i+1}$ between two consecutive mirrors $M_i$ and $M_{i+1}$ is represented by a magnification $1/G_{i,i+1}$ with respect to the values taken by the angular deflection positions; the figures of the positions deflected by a mirror $M_i$ and that of the positions incident on the next mirror $M_{i+1}$ are therefore also in the ratio $1/G_{i,i+1}$.

FIG. 5 shows the example, in this representation, of the change in the various figures adopted by the traces of the incident beams (in the planes of type P') and deflected beams (in the planes of type P") at the entrance and at the exit of the various uniaxial mirrors (of the $M_1$ type) of a cascade for which N=5 and P=2, which is a particularly useful configuration.

The main deflection parameters then take the following values, which may be found in FIG. 5:

number of deflected optical beams: $P^N=2^N=32$ for N=5;

angular separation between the deflection positions of the beams: $\delta\alpha_N=2\Delta\theta/2^{N-1}=\Delta\theta/8$;

total angular excursion $\Delta\alpha_N=31\Delta\theta/8$; $\Delta\alpha_N\rightarrow 4\Delta\theta$ when $N\rightarrow\infty$.

In the case of three positions (the case in which P=3, not illustrated in a Figure), the same parameters become:

number of deflected optical beams: $P^N=3_N=243$ for N=5;

angular separation between the deflection positions of the beams: $\delta\alpha_N=\Delta\theta/3^{N-1}=\Delta\theta/81$;

total angular excursion $\delta\alpha_N=242\Delta\theta/81$; $\Delta\alpha_N\rightarrow 3\Delta\theta$ when $N\rightarrow\infty$.

5.2 Cascade of Mirrors Oscillating About Two Perpendicular Rotation Axes OX and OY If each of the mirror elements $M_i$ can oscillate about two, favorably perpendicular, axes $OX_i$, and $OY_i$ (each of the rotation axes being parallel to OX and OY, respectively), a distribution of the angular deflection positions along two perpendicular axes is obtained. This novel configuration, which corresponds to the diagram showing the reflection by mirrors M'$_1$ illustrated in FIG. 4b, makes it possible, for a given number N of deflection means in the cascade, to considerably increase the number of potentially accessible positions and at the same time have a two-dimensional matrix distribution of angular deflection positions.

This configuration is particularly beneficial as a matrix (a square matrix if the angular excursions along the two perpendicular rotation axes are identical) of angular deflection positions is obtained at the exit of each mirror element. It should be noted that the matrix of positions obtained has a diamond shape—it was just mentioned that it could be a square in the aforementioned case—the sides of which are inclined with respect to the projections of the axes OX and OY.

This configuration is particularly attractive for many applications. It is illustrated in FIG. 6, which shows, as previously, the change in the positions of the various incident and deflected optical beams at the entrance and exit of each mirror having four rotation positions (two positions along the axes $OX_i$ parallel to OX and two positions along the axes $OY_i$ parallel to OY) of the cascade.

At the exit of the mirror elements of the N-th deflection means of the cascade, $4^N$ angular deflection positions distributed in a matrix ($2^N \times 2^N$) are obtained, the main parameters of which, along the two perpendicular axes, are given by the above formulae for P=2.

Thus, the following are obtained:

for N=3: 64 potential deflection positions (instead of 8 in the case of uniaxial mirrors);

for N=4: 256 positions instead of 16; and for N=5: 1 024 positions instead of 32.

5.3 Cascade of Uniaxial Mirrors for Obtaining a Matrix of Angular Deflection Positions The above $2^N \times 2^N$ matrices may also be obtained by two successive cascades of mirror elements that oscillate about a single rotation axis and have only two deflection positions. For this, it is necessary to place the common direction of the axes of the first cascade of N deflection means composed of uniaxial mirror elements perpendicular to the common direction of the axes of the second cascade also formed from N deflection means composed of uniaxial mirror elements.

Figure 7:
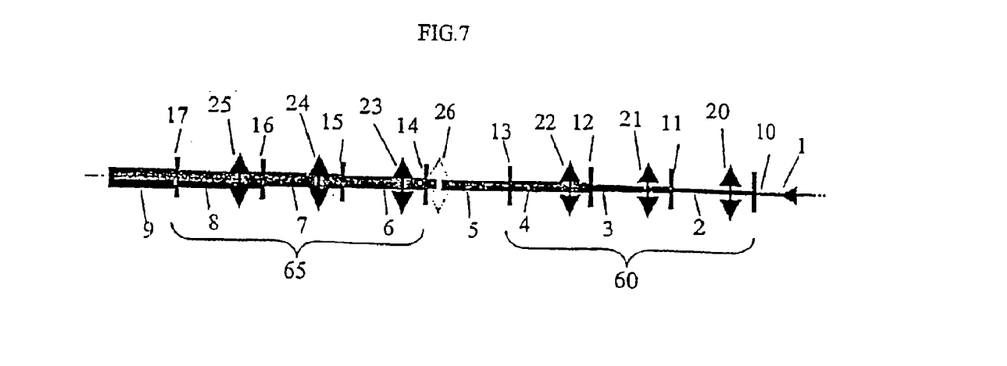
FIG. 7 is a simplified diagram of a double cascade of uniaxial mirrors, making it possible to obtain deflection figures equivalent to those of a cascade of biaxial mirrors.

This configuration is represented schematically in FIG. 7.

FIG. 7 thus shows a diagram of an architecture with a first cascade 60 of mirrors 10, 11, 12 and 13 that can adopt two positions of rotation about a single axis OX followed by a second cascade 65 of mirrors 14, 15, 16 and 17 that can adopt two positions of rotation about an axis OY orthogonal to OX. This architecture makes it possible to obtain deflection figures equivalent to those of a cascade of mirrors that can each adopt two positions of rotation about two orthogonal rotation axes OX and OY (the case shown in FIG. 6) but involves a larger total number of mirrors.

This configuration uses, in addition to the optical conjugation means 20, 21, 22 and 23, 24, 25 needed for each cascade to operate correctly, an additional optical conjugation means 26 providing the object/image relationship between the last deflection means of the first cascade and the first deflection means of the second cascade with a magnification $G_L$ that makes the deflection figures symmetrical when the two cascades 60 and 65 are identical.

The first cascade of N deflection means (composed, to simplify each, of single mirror elements 10, 11, 12, 13, etc. in a row), that for ease of understanding may be termed a "horizontal cascade H", gives $2^N$ angular deflection positions in the horizontal direction (in a similar manner to the case shown in FIG. 5); the second cascade of N deflection means (composed, to simplify each, of single mirror elements 14, 15, 16, 17, etc. in a row), which may be called the "vertical cascade V", then multiplies these $2^N$ positions by $2^N$ along the vertical direction, thus giving the $2^N \times 2^N$ matrix of desired angular deflection positions.

However, notice should be taken of the fact that, in the above configuration, the total angular magnification introduced by the set of conjugation means 20, 21, 22 in the horizontal direction will be $\frac{1}{2}^{2\times(N-1)}$, whereas it will only be $\frac{1}{2}^{N-1}$ in the vertical direction in which it is introduced only by the conjugation means 23, 24 and 25, which results in the formation of an unsymmetrical matrix of deflection positions with a form ratio equal to $2^{N-1}$. This may prove not to be very beneficial in some applications, in particular for optical routing applications.

However, this point may be overcome by introducing, between the two "H" and "V" cascades of mirrors, optical conjugation means that make it possible to compensate for this dissymmetry.

This is the reason why it was mentioned that, in FIG. 7, an optical conjugation means 26 is provided for linking the mirror elements of the last deflection means of the first cascade (in the example of FIG. 7, the micromirror 13) with the mirror elements of the first deflection means of the second cascade (in the example of FIG. 7, the micromirror 14); the linking optical conjugation means 26, each of the refractive (microlens type) or reflective (micromirror type) elements of which ensures spatial magnification $G_L = \frac{1}{2}^{N-1}$ (and therefore the desired angular magnification $2^{N-1}$).

Figure 8:
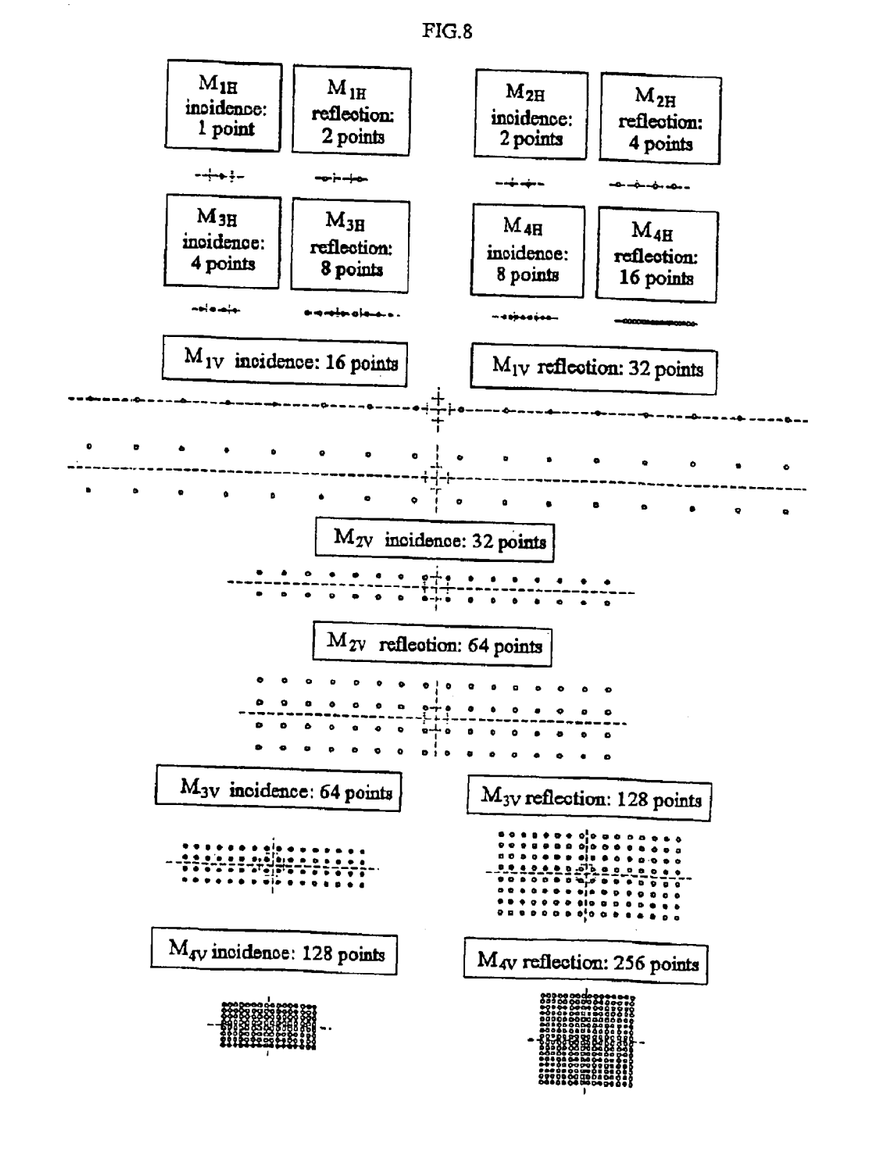
FIG. 8 is a diagram similar to those of FIGS. 5 and 6, showing the change in the number of angular positions before (under the blocks marked "incidence") and after (under the blocks marked "reflection") passage through each of the deflection means of FIG. 7, having single mirrors that can adopt two angular positions about a single axis.

The configuration of angular deflection positions that is obtained at the entrance and at the exit of each deflection means is illustrated in FIG. 8 in which the mirrors of the horizontal cascade are denoted $M_{1H}$, $M_{2H}$, $M_{3H}$ and $M_{4H}$ and the mirrors of the vertical cascade are denoted $M_{1V}$, $M_{2V}$, $M_{3V}$ and $M_{4V}$; it does give a matrix of angular deflection positions that is similar to that in FIG. 6, but with uniaxial mirrors identical to those in FIG. 4a that are technologically simpler to produce. It may be noted that the dimensions of the matrix obtained are, unlike that shown in FIG. 6, parallel to the axes OX and OY.

However, to obtain identical complexities (number of angular deflection positions), it requires twice the number of deflection means compared with the solution having two rotation axes shown in FIGS. 5 and 6:

six deflection means instead of three (three "H" deflection means and three "V" deflection means) in order to have 64 angular deflection positions ($2^3 \times 2^3$ in the first case and $4^3$ in the second);

eight deflection means instead of four (four "H" and four "V") in order to have 256 deflection positions ($2^4 \times 2^4$ in the first case and 44 in the second).

5.4 Generalization

The basis of the principle of the invention provides for many possible configurations that cannot all be described here in detail.

However, mention may be made of the configuration that uses a cascade of deflection means composed of mirrors oscillating about two systems of orthogonal rotation axes oriented at 45° to each other and having three possible deflection positions about each of the axes (for example, one reference position and two extreme positions on either side of this reference position).

If the angular excursions along the two systems of perpendicular axes are in the ratio of $\sqrt{2}$, at the exit of the N-th mirrors there are $9^N$ angular deflection positions, which results in a complexity of 81 for a cascade of only two deflection means and of 729 for a cascade of three deflection means, and therefore a very much greater complexity, for an equivalent number of mirrors, than the previous complexities.

Furthermore, to simplify matters in the examples given, we have given preference to the matrix configurations of deflection positions that are obtained from deflection means composed of elements having positions of rotation about orthogonal axes and the same rotation parameters with respect to each of the axes; of course, it is possible to produce matrix configurations of unsymmetric shapes (rectangles, diamonds, etc.) by choosing non-orthogonal axes and/or the position rotation parameters (angular excursion $\Delta\theta$ or number of angular positions) along the various rotation axes involved.

5.5 Folding the System

FIGS. 2 and 3a–c show cascades of deflection means inclined at 45° to the optical axes of the system; of course, the angle of inclination may be different and take any values $\phi$ that have only to be consistent with the dimensional constraints tied, on the one hand, to the size of the optical elements involved and, on the other hand, to the desired overall size of the device.

Figure 9:
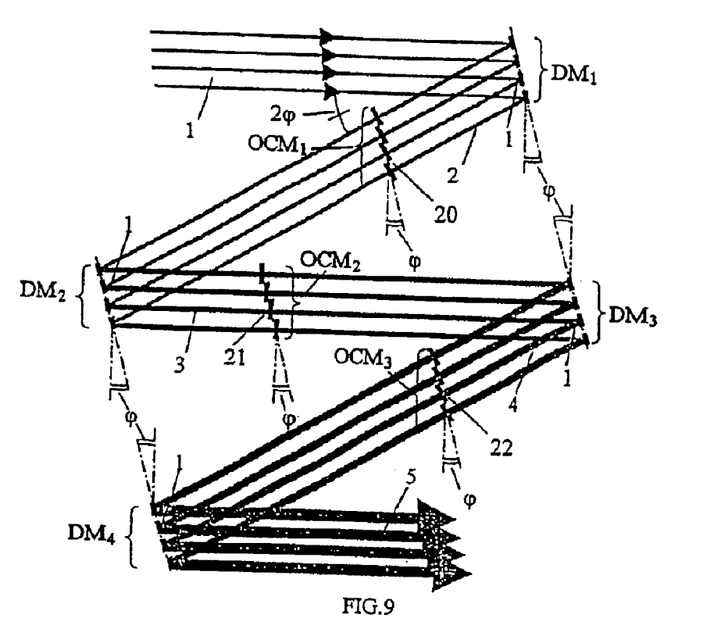
FIG. 9 shows a module using a cascade of deflection means inclined at any angle φ with respect to a plane perpendicular to the optical axis of the system.

FIG. 9 illustrates a module using a cascade of deflection means 10, 11, 12 and 13 having four elements, the various elements of which are inclined at any angle T to planes perpendicular to the optical axis of the system. At each mirror reflection, the optical axis of the system rotates through an angle $2\phi$. To achieve perfect operational symmetry between the various elements, and between the various families of deflected light rays, in the case of devices in the form of linear arrays or in matrices, the conjugation means are advantageously all inclined at the same angle $\phi$; the optical axis of each of the elements making up the various conjugation means favorably remain parallel to the optical axis of the system so as to minimize the optical aberrations.

5.6 Monitoring the Operation

As for any system, it is beneficial to have a monitoring element 50 for ensuring that the desired function is indeed fulfilled.

In the device of the invention, it is thus possible to check whether the anticipated angular deflection positions at the exit of the device are actually achieved. In practice, to have complete information about the cause of a potential fault, it is useful to be able to monitor the operational state of the device at each stage of the cascade of mirrors.

Figure 10A:
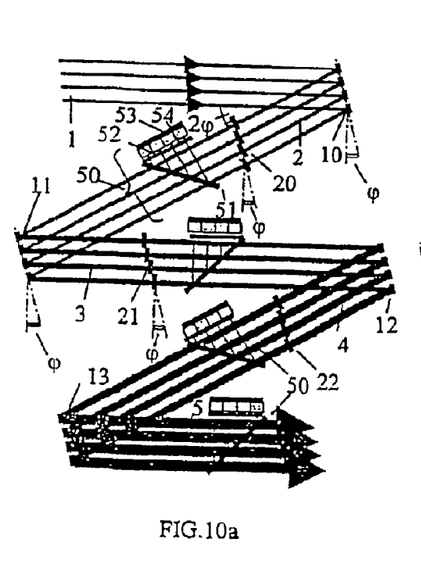
FIG. 10a shows the module of FIG. 9 together with means for monitoring the angular positions, by taking off some of the light power of the deflected beam.

This monitoring may be carried out, as shown in FIG. 10a, by providing, after each deflection means, means 50 for monitoring the angular positions adopted by each of the deflection elements.

More precisely, this monitoring is performed in the case of FIG. 10a by taking off a small portion of the deflected rays (and therefore of the light power of the beams at the point in question) via the various elements that make up the deflection means to be monitored, using a splitter plate 51 and by projecting all of these rays on a position detector 53 (consisting, for example, of a linear array or a matrix of CMOS-type photodetectors) using an optical projection module 52 of any suitable known type (for example, one consisting of a linear array or of a matrix of suitable microlenses or micromirrors). The position of the photodetectors 53 is advantageously chosen to be at or near the focal plane of the elements of the optical projection system so as to achieve, in a simple manner, one-to-one correspondence between each of the angular deflection positions and the spatial distribution of the light spots received on the photodetector.

The distribution of "image" spots or pixels on the position detector 53 is advantageously chosen so as to be homothetic with the distribution of the angular deflection positions to be monitored. An optical image reduction or magnification system 54 is optionally associated for this purpose with the optical projection module 52 in order to match the dimensions of the deflection means of the module to those of the position detector 53.

The number of pixels on the photodetector matrix for monitoring the state of the module at the exit of one stage of the cascade is preferably at least to be equal to the total number of angular deflection positions potentially generated at the cascade stage in question. For example, for stage number i lying between the deflection means $DM_i$ and $DM_{i+1}$, the cascade of mirrors generates $P_{Ti}$ angular positions ($P_{Ti}=P_1 \times P_2 \times \ldots P_i$):

for a cascade of deflection means having a single element, there must be $P_{Ti}$ image pixels;

for a cascade of deflection means composed of linear arrays of K elements, there must be $K \times P_{Ti}$ image pixels; and for a cascade of deflection means composed of matrices of $K \times K'$ elements, there must be $K \times K' \times P_{Ti}$ image pixels.

Figure 10B:
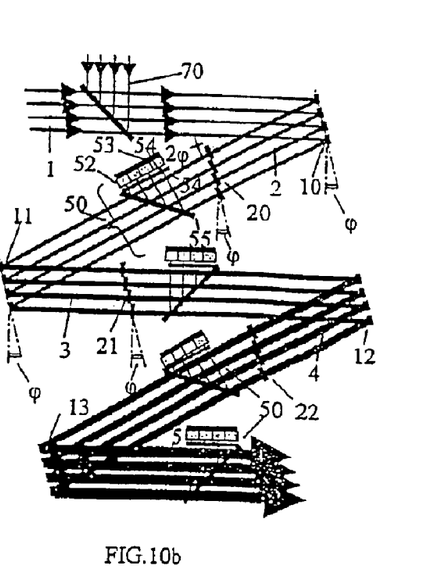
FIG. 10b shows the module of FIG. 9 together with means for monitoring the angular positions, by taking off some of the light power of the ancillary optical beams.

Another solution for monitoring the angular deflection positions, using photodetection means and an optical imaging system that are similar to the previous case, may consist in using external optical beams 70 superposed on the optical beams of the module, as shown in FIG. 10b that illustrates a module possessing, after each deflection means, monitoring means 50 for monitoring the angular positions adopted by each of the deflection elements by taking on a portion of the light power of ancillary optical beams. These external (or ancillary) beams advantageously have a wavelength different from that of the incident beams; they are directed onto the monitoring means by favorably dichroic splitter plates 55. The elements of these monitoring means are similar to those in FIG. 10a.

Of course, the module may be monitored not at the exit of each deflection means $DM_i$, as shown in FIGS. 10a and lob, but, for example, only at the exit of the last deflection means $DM_N$.

It may be noted that the above examples, presented by way of preference, describe:

a module involving a cascade of M optical beam deflection means $DM_1, DM_2, DM_3, \ldots, DM_i, \ldots DM_N$ each able to adopt only a limited number of configurations $P_1, P_2, P_3, \ldots P_i, \ldots P_N$ in such a way that:

each configuration $P_1, P_2, P_3, \ldots P_i, P_N$ makes it possible to deflect any incident optical beam into the same limited number of favorably equidistant angular deflection positions $ADP_1, ADP_2, ADP_3, \ldots ADP_i, \ldots ADP_N$;

each deflection means $DM_i$ of the cascade (I ranging from 1 to N-1) is made optically conjugate with the deflection means $DM_{i+1}$ that follows it by refractive optical conjugation means (lenses) or reflective optical conjugation means (mirrors) $OCM_i$ involving a magnification $G_{i,i+1}$;

the value of the magnification $G_{i,i+1}$ is calculated from the various deflection parameters so as to obtain, from an initial incident beam, the increase in the number of beams deflected into different and favorably equidistant deflection positions at each new stage of the cascade (and therefore at the exit of the various deflection means $DM_1, DM_2, DM_3, \ldots, DM_i, \ldots DM_N$).

The invention may be readily generalized to deflection means $DM_1, DM_2, DM_3, \ldots, DM_i, \ldots DM_N$ formed from any number K of elements grouped together into linear arrays or into matrices in which the corresponding elements of two consecutive deflection means $DM_i$ and $DM_{i+1}$ are made optically conjugate by linear arrays or matrices of refractive or reflective optical conjugation means $OCM_i$ that are equivalent both in size and complexity to those of the deflection means.

The optical magnification between the corresponding elements of two linear arrays or of two matrices of consecutive deflection means will then also be equal to $G_{i,i+1}$ provided that each of the elements making up the linear arrays or the matrices of the cascade have the same characteristics as those defined in the case of single deflection means.

In this case, the invention allows increasing multiplication, for each of the K incident optical beams, of the number of potential different angular deflection positions adopted at the exit of each stage of the cascade and thus makes it possible to form K families of identical deflected beams;

a module of the aforementioned type, in which the cascaded deflection elements $DM_1, DM_2, DM_3, \ldots, DM_i, \ldots DM_N$ are composed of deflection elements (10, 11, 12, 13, etc.) of the single mirror type or are arranged, for example, in linear arrays or in matrices, each able to adopt, respectively, $P_1, P_2, \ldots P_i, \ldots P_N$ configurations of different angular positions making it possible to generate an equivalent number of different angular deflection positions $ADP_1, ADP_2, \ldots ADP_i, ADP_N$, each angularly separated by respective values $\delta\theta_1, \delta\theta_2, \ldots \delta\theta_i, \ldots \delta\theta_N$ about at least one family of rotation axes $OX_1, OX_2, OX_i, \ldots OX_N$ of common direction, the total angular excursions of each of the elements and meeting the following characteristics:

the total angular excursions $\Delta\theta_1, \Delta\theta_2, \ldots \Delta\theta_i, \ldots \Delta\theta_N$ presented by each of the elements of the deflection means $DM_1, DM_2, \ldots, DM_i, \ldots DM_N$ about one and the same family of axes are identical and equal to $\Delta\theta$, which means that:

$(P_1-1)\delta\theta_1(P_2-1)\delta\theta_2= \ldots (P_i-1)\delta\theta_i= \ldots (P_N-1)\delta\theta_N=\text{constant}=\delta\theta;$ the magnifications $G_{i,i+1}$ allowing pairwise conjugation of the various elements of two consecutive deflection means $DM_i$ and $DM_{i+1}$ are equal to:

$G_{i,i+1}=P_i\times(P_{i-1}-1)/(P_i-1),$ the device thus described making it possible, in the case of the same family of single rotation axes, to obtain, at the exit of any of the elements of the deflection means $DM_i$ of the cascade, a number $P_1 \times P_2 \times \ldots P_i \times \ldots P_N$ different angular deflection positions, all equidistant and arranged linearly along an axis perpendicular to this common direction.

In particular at the exit of the elements of the last deflection means $DM_L$, the total number $P_{TN}$ of different, angularly equidistant and linearly arranged angular deflection positions will be:

$P_{TN}=\Pi_{(i=1\to N)}P_i;$ an optical module of the aforementioned type in which the elements 10, 11, 12, 13, etc. of the deflection means $DM_1, DM_2, \ldots DM_i, \ldots DM_N$ each having two different angular positions separated by an angle $\delta\theta_X$ about axes parallel to a common direction OX and two different angular positions separated by an angle $\delta\theta_Y$ (favorably equal to $\delta\theta_X$) about axes parallel to a common direction OY, favorably perpendicular to OX, and such that the magnifications $G_{i,i+1}$ of the various elements of the optical means $OCM_i$ making the corresponding elements of two consecutive deflection means $DM_i$ and $DM_{i+1}$ optically conjugate are all equal to 2 (general formula for $G_{i,i+1}$ applying to the particular case $P_i=P_{i+1}=2$), the device thus described making it possible to obtain matrix configurations of the figures of angular deflection positions and to obtain, for a given number N of deflection means involved in the cascade, a larger number of different deflection positions;

a optical module of the aforementioned type, characterized by the placement in series of two successive cascades of deflection means $DM_1, DM_2, \ldots DM_i, \ldots DM_N$, the different elements 10, 11, 12, 13, etc. of which can adopt angular positions $P_1, P_2, \ldots P_i, \ldots P_N$ only along a single common direction and in which the single common direction of the rotation axes of each of the elements of the deflection means of the first cascade is chosen to be orthogonal to the common direction of the rotation axes of each of the elements of the deflection means of the second cascade.

In this configuration, the elements of the last deflection means of the first cascade will be made optically conjugate with the corresponding elements of the first deflection means of the second cascade by a linking optical conjugation means 26, each of the elements of which has a magnification $G_L$ making the figure of the angular deflection positions at the exit of the elements of the last deflection means of the second cascade symmetrical. This configuration makes it possible, with deflection elements that can oscillate only about a single rotation axis, to generate matrix configurations of figures of angular deflection positions similar to the device of claim 3;

an optical module of the aforementioned type in which the number of different angular positions $P_1, P_2, \ldots P_i, \ldots P_N$ that can be adopted by the various elements of the deflection means $DM_1, DM_2, \ldots DM_i, DM_N$ about the various rotation axes of common direction $OX_1, OX_2, \ldots OX_i, \ldots OX_N$ is equal to 2 or 3, it then being possible for the magnifications $G_{i,i+1}$ to adopt the following various values:

$G_{i,i+1}=P_i(P_{i+1}-1)/(P_{i-1})=2$ for $P_i=2$ and $P_{i+1}=2$ $G_{i,i+1}=P_i(P_{i+1}-1)/(P_{i-1})=3$ for $P_i=3$ and $P_{i+1}=3$ $G_{i,i+1}=P_i(P_{i+1}-1)/(P_{i-1})=4$ for $P_i=2$ and $P_{i+1}=3$ $G_{i,i+1}=P_i(P_{i+1}-1)/(P_{i-1})=3/2$ for $P_i=3$ and $P_{i+1}=2$ an optical module of the aforementioned type such that the deflection means are formed by single swivel micromirrors, from a linear array of K' swivel micromirrors or from a matrix of K'×K" swivel micromirrors making it possible to increase the number of angular positions respectively of a single incident optical beam or of K' parallel incident optical beams (the case of linear arrays of K' micromirrors) or of K'×K" parallel incident optical beams (the case of matrices of K'×K" micromirrors), the single swivel micromirrors, the linear arrays or the matrices of swivel micromirrors being able to be produced using the collective fabrication processes involved in microtechnologies;

an optical module of the aforementioned type in which the optical conjugation means $OCM_i$ associated with two consecutive deflection means $DM_i$ and $DM_{i+1}$ are formed from elements 20, 21, 22, 23, etc. of the single micro lens (or single micromirror), linear array or matrices of microlenses (or micromirrors) type when the deflection means are themselves formed from elements 10, 11, 12, 13, 14, etc. of the type comprising single swivel micromirrors, linear arrays or matrices of swivel micromirrors, single micro lenses (or micromirrors) or microlenses (or micromirrors) arranged in linear arrays or in matrices that can be produced using the collective fabrication processes involved in microtechnologies;

an optical module of the aforementioned type in which the deflection means $DM_i$ involved are all inclined to the optical axes of the device at an angle φ that may be chosen to be 45°;

an optical module of the aforementioned type in which the deflection means $DM_i$ and optical conjugation means $OCM_i$ grouped together in linear arrays or in matrices are all inclined at the same angle φ to the general optical axis of the device, but for which each of the optical axes of the various elements 20, 21, 22, 23, etc. making up the conjugation means remains parallel to this general optical axis in order to minimize the aberrations introduced by these various elements into the various deflected beams involved;

an optical module of the aforementioned type in which the deflection positions of each of the deflection elements are monitored by monitoring means 50 using:

spatial splitting means 51 for taking off a fraction of the light power of the optical signal beams deflected by the various deflection means;

optical projection means 52 for converting, in a one-to-one manner, the various angular deflection positions into as many spatial positions, these optical imaging means being grouped in configurations identical to those of the deflection means (linear arrays or matrices of elements). In certain cases they may be combined with image magnification means 54;

detection means 53 for detecting the spatial positions thus formed, comprising a number of pixels at least equal to the total number of angular positions generated at the monitoring stage in question, the configuration of the pixels of the photodetector being homothetic with that of the set of angular deflection positions to be monitored. These detection means may favorably be linear arrays or matrices of commercially available CMOS photodetectors;

a module in which the means 50 for monitoring the angular deflection positions use ancillary optical beams 70 that favorably have a wavelength different from that of the main beams and are superposed on the latter using dichroic plates 55.

It was indicated that each deflection element $DM_i$ is made optically conjugate with that that precedes it by a conjugation element of magnification $G_{i-1,i}$.

Favorably, each conjugation element is composed of two lenses that make it possible to obtain the desired magnifications and are arranged in a confocal manner.

These two lenses have focal lengths whose ratio is equal to the desired magnification $G_{i-1,i}$.

As an example, in the case of deflection means of the micromirror type having two positions, the magnification $G_{i-1,i}$ is equal to 2 and the ratio of the focal lengths of the two lenses will also be equal to 2 with a confocal arrangement illustrated in FIG. 11.

Generally speaking, the lenses used in the module of the invention are preferably microlenses produced using the generally collective fabrication processes involved in microtechnologies.

What is claim is:

1. An optical deflection module designed to generate a plurality of angular positions for at least one incident optical beam, this module comprising, for each optical beam, a line comprising:

a plurality of N deflection elements (DM1, DM2, $DM_i$, $DM_N$) placed in cascade and each able to adopt, respectively, $P_1$, $P_2$, $P_i$, or $P_N$ different angular deflection configurations about at least one given axis; and a plurality of N−1 optical conjugation elements ($OCM_1$, $OCM_2$, ... $OCM_i$, ... $OCM_{N-1}$) each placed between two successive deflection elements so as to produce an object/image conjugate between these successive deflection elements.

2. The module as claimed in claim 1, designed to generate a plurality of angular positions for a plurality of incident optical beams, in which there is one row for each incident optical beam, and the deflection elements and the optical conjugation elements of each row are grouped together, with the homologous elements of the other rows, within entities consisting of linear arrays.

3. The module as claimed in claim 2, the deflection elements grouped together within each entity of which have numbers $P_1$, $P_2$, ..., $P_i$, ... or $P_N$ of different angular deflection configurations that are identical.

4. The module as claimed in claim 2, the deflection elements ($DM_1$, $DM_2$, ... $DM_i$, ... $DM_N$) of which, placed in cascade and each able to adopt, respectively, $P_1$, $P_2$, ... $P_i$, ... or $P_N$ different angular deflection configurations, have single parallel given axes.

5. The module as claimed in claim 2, the deflection elements ($DM_1$, $DM_2$, ... $DM_i$, ... $DM_N$) of which, placed in cascade and each able to adopt, respectively, $P_1$, $P_2$, ... $P_i$, ... or $P_N$ different angular deflection configurations, have single given axes parallel to one or other of the two reference axes (OX, OY).

6. The module as claimed in claim 2, the deflection elements ($DM_1$, $DM_2$, ... $DM_i$, ... $DM_N$) of which, placed in cascade and each able to adopt, respectively, $P_1$, $P_2$, ... $P_i$, ... or $P_N$ different angular deflection configurations, each have two given axes parallel to two reference axes (OX, OY).

7. The module as claimed in claim 1, designed to generate a plurality of angular positions for a plurality of incident optical beams, in which there is one row for each incident optical beam, and the deflection elements and the optical conjugation elements of each row are grouped together, with the homologous elements of the other rows, within entities consisting of matrices.

8. The module as claimed in claim 1, characterized in that the different angular deflection configurations are equidistant about the given axes.

9. The module as claimed in claim 1, in which the deflection elements $DM_1$, $DM_2$, ... $DM_i$, ... $DM_N$ in cascade may each adopt, by tilting about at least one given axis, respectively, $P_1$, $P_2$, ... $P_i$, ... $P_N$ different angular position configurations making it possible to generate an equivalent number of different angular deflection, each separated angularly by respective values $\delta\theta_1$, $\delta\theta_2$, ... $\delta\theta_i$, ... $\delta\theta_N$ about at least one family of rotation axes $OX_1$, $OX_2$, ... $OX_i$ ..., $OX_N$.

10. The module as claimed in claim 9, the family of rotation axes of which have a common direction.

11. The module as claimed in claim 9, in which the total angular excursions of each of the deflection elements are the same.

12. The module as claimed in claim 9, in which the magnifications $G_{i,i+1}$ allowing pairwise conjugation of the various consecutive deflection elements $DM_i$ and $DM_{i+1}$ are equal to:

$$G_{i,i+1} = P_i(P_{i+1}-1)/(P_i-1).$$

13. The optical module as claimed in claim 9, in which the deflection elements (10, 11, 12, 13, etc) each have two different angular positions separated by an angle $\delta\theta_X$ about axes parallel to a common direction OX and two different angular positions separated by an angle $\delta\theta_Y$ about axes parallel to a common direction OY and such that the magnifications $G_{i,i+1}$ of the various optical conjugation elements are all equal to 2.

14. The module as claimed in claim 13, in which the angle $\delta\theta_Y$ is equal to $\delta\theta_X$.

15. The module as claimed in claim 13, in which the axis OY is perpendicular to OX.

16. The module as claimed in claim 9, characterized in that the deflection elements are swivel mirrors.

17. The module as claimed in claim 9, characterized by a series placement of two successive cascades, the various deflection elements (10, 11, 12, 13, . . . ) of which can adopt angular positions $P_1$, $P_2$, ... $P_i$, ... $P_N$ only along a single common direction and in which the single common direction of the rotation axes of each of the deflection elements of the first cascade is chosen to be orthogonal to the common direction of the rotation axes of each of the deflection elements of the second cascade.

18. The module as claimed in claim 9, in which the number of different angular positions $P_1$, $P_2$, ... $P_i$, ... $P_N$ that can be adopted by the various deflection elements $DM_1$, $DM_2$, ... $DM_i$, ... $DM_N$ about the various rotation axes of common direction $OX_1$, $OX_2$, ... $OX_i$ ..., $OX_N$ is equal to 2 or 3, it being possible for the magnifications $G_{i,i+1}$ then to adopt the following various values;

$$G_{i,i+1} = P_i(P_{i+1}-1)/(P_i-1) = 2 \text{ for } P_i=2 \text{ and } P_{i+1}=2$$

$$G_{i,i+1} = P_i(P_{i+1}-1)/(P_i-1) = 3 \text{ for } P_i=3 \text{ and } P_{i+1}=3$$

$$G_{i,i+1} = P_i(P_{i+1}-1)/(P_i-1) = 4 \text{ for } P_i=2 \text{ and } P_{i+1}=3$$

$$G_{i,i+1} = P_i(P_{i+1}-1)/(P_i-1) = 3/2 \text{ for } P_i=3 \text{ and } P_{i+1}=2.$$

19. The module as claimed in claim 1, in which the deflection elements comprise swivel micromirrors produced using the collective fabrication processes involved in microtechnologies.

20. The optical module as claimed in claim 19, characterized in that each optical conjugation element associated with two consecutive deflection elements comprises at least two lenses in confocal configuration, the ratio of the focal lengths of which is equal to the desired magnification between the two elements.

21. The optical module as claimed in claim 1, in which the optical conjugation elements associated with two consecutive deflection elements comprise respectively at least one lens.

22. The optical module as claimed in claim 1, in which the deflection elements involved are all inclined to the optical axis at an angle $\phi$ chosen to be 45°.

23. The optical module as claimed in claim 1, in which the deflection and optical conjugation elements are grouped in linear arrays or in matrices and are all inclined at the same angle $\phi$ to the general optical axis of the device, but for which each of the optical axes of the various conjugation elements (20, 21, 22, 23, etc) remains parallel to this general optical axis.

24. The optical module as claimed in claim 1, in which the deflection positions of each of the deflection elements are monitored by a monitoring device (50) using:

spatial splitter elements (51) for taking off a fraction of the light power of the optical signal beams deflected by the various deflection elements;

optical projection elements (52) for converting, in a one-to-one manner, the various angular deflection positions into as many spatial positions, these optical projection elements being grouped in configurations identical to those of the deflection elements; and detection elements (53) for detecting the spatial positions thus formed, having a number of pixels at least equal to the total number of angular positions generated within the monitoring stage in question, the configuration of the pixels of the photodetector being homothetic with that of the set of angular deflection positions to be monitored.

25. The module as claimed in claim 24, in which the optical projection elements are associated with image magnification elements (54).

26. The module as claimed in claim 24, in which the detection elements are linear arrays or matrices of CMOS photodetectors.

27. The module as claimed in claim 24, in which the device (50) for monitoring the angular deflection positions uses ancillary optical beams (70) that have a wavelength favorably different from that of the optical signal beams and are superposed on the latter using dichroic plates (55).

28. The module as claimed in claim 1, characterized in that each deflection element has a number of different angular deflection configurations about a given axis equal to 2.

29. The optical module as claimed in claim 1, characterized in that it furthermore includes an additional conjugation element placed after the final deflection element.

* * * * *

UNITED STATES PATENT AND TRADEMARK OFFICE
CERTIFICATE OF CORRECTION

PATENT NO. : 6,900,921 B2
DATED : May 31, 2005
INVENTOR(S) : Serge Valette

It is certified that error appears in the above-identified patent and that said Letters Patent is hereby corrected as shown below:

<u>Title page,</u>
Item [30], Foreign Application Priority Data, change "01 2923" to -- 0102923 --.

Signed and Sealed this

Sixteenth Day of August, 2005

JON W. DUDAS
*Director of the United States Patent and Trademark Office*